United States Patent Office 3,405,146
Patented Oct. 8, 1968

1

3,405,146
SELECTED HYDROXYDI(PERFLUOROALKYL)
METHYL - SUBSTITUTED ANDROSTANES
AND ESTRANES
Eugene A. La Lancette, Hockessin, Del., assignor to E. I.
du Pont de Nemours and Company, Wilmington, Del.,
a corporation of Delaware
No Drawing. Filed May 5, 1966, Ser. No. 547,758
8 Claims. (Cl. 260—397.4)

ABSTRACT OF THE DISCLOSURE

Described and claimed are 3-keto-17-[hydroxybis(perfluoroalkyl)methoxy]-androstanes and estranes and their 4-unsaturated derivatives as represented by the structural formula

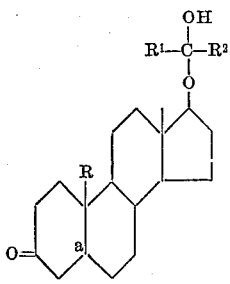

wherein
R is hydrogen or methyl;
$R^1$ and $R^2$, which may be the same or different, are each perfluoro lower alkyl where the term "lower alkyl" is defined as an alkyl group containing 1 through 6 carbon atoms; and
$a$ is a single or a double carbon carbon bond.

The new compounds of this invention are useful in that besides being potent anti-implantation and anti-ovulation agents, they all possess androgenic and anabolic activity.

FIELD OF THE INVENTION

This invention relates to hydroxyperfluoroalkoxyl steroids and their preparation. More specifically, the invention concerns 3-keto-17-[hydroxybis(perfluoroalkyl)methoxy]-androstanes and estranes and their 4-unsaturated derivatives.

The novel compounds of the invention can be represented by the structural formula

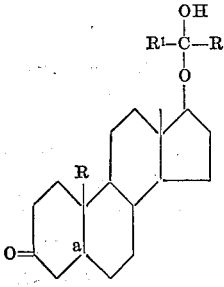

wherein R is selected from hydrogen or methyl; $R^1$ and $R^2$ each are perfluoro lower alkyl; and $a$ is selected from a single or a double bond. The term "lower alkyl" is defined herein as an alkyl group containing 1 through 6 carbon atoms. $R^1$ and $R^2$ can be the same or different, but preferably are the same.

DESCRIPTION OF THE INVENTION

The novel compounds of this invention are prepared by a process which comprises reacting 3-keto-17-hydroxy-

2 androstane, 3-keto-17-hydroxyestrane, or their 4-unsaturated derivatives, i.e., steroids of the structural formula

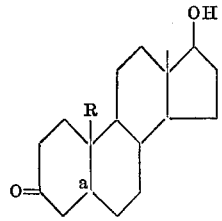

wherein R and $a$ are as defined above, with a perfluoro lower alkyl ketone of the formula

wherein $R^1$ and $R^2$ are as defined above. The reaction takes place by bringing the reactants in contact and allowing the reaction to proceed at a temperature with the range of about $-80°$ C. to about $+50°$ C.

Reactant proportions are not critical, but as a matter of convenience, the molar ratio of the ketone to the steroid is generally between 1:1 and 10:1 or more. A solvent is not necessary for the ketone can serve as the reaction medium, especially when it is used in excess. In general, however, an inert, non-hydroxylated solvent is employed. Examples of suitable solvents are the acyclic or cyclic hydrocarbon ethers such as diethyl ether, di-n-butyl ether, 1,2-dimethoxyethane, dioxane or tetrahydrofuran; the aromatic hydrocarbons such as benzene, toluene or the xylenes; the alkanoic acid esters such as ethyl acetate or methyl propionate; and the like.

The reaction can be conducted in a sealed vessel under autogenous pressure, especially when the perfluoroketone is a gas at the reaction temperature. With the higher boiling perfluoroketones it is more convenient to operate at atmospheric pressure, under reflux if necessary, and this can also be done with the low boiling perfluoroketones by using the appropriate coolant in the reflux condenser. Depending on the reaction temperature, reaction times of about 1 to 24 hours are satisfactory. However, neither pressure nor time is critical.

Appreciable product formation takes place even at the lower limit of the temperature range, but in practice it is advantageous for part at least of the reaction to be conducted in the range of 0–25° C. Preferably, the reaction mixture is maintained below 35° C. throughout.

The reaction product, which is a hemiketal, can be isolated by any convenient method, such as removal of the solvent and excess perfluoroketone, if any, followed if necessary by purification of the residue by crystallization from an appropriate solvent or by chromatographic methods.

The following examples illustrate the invention in greater detail, but the invention is not limited to the details shown therein.

EMBODIMENTS OF THE INVENTION

Example 1.—17β-(hexafluoro-2-hydroxyisopropoxy)-androst-4-ene-3-one

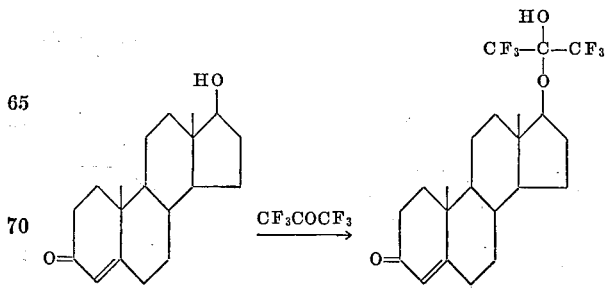

To a cooled (−78° C.) solution of 5 g. (0.017 mole) of testosterone in 100 ml. of anhydrous tetrahydrofuran in a flask mounted with a Dry Ice-acetone condenser was added 8 ml. of hexafluoroacetone (measured as the liquid at −78° C., 0.077 mole). After stirring at −78° C. for 1 hour, the reaction mixture was allowed to warm to ambient temperature over a period of 1 hour and stirred for 21 hours. The reaction mixture was then evaporated to dryness in vacuo and the residue was crystallized from ethyl acetate to give 6.7 g. (85% yield) of the hemiketal.

An analytical sample prepared by recrystallization from ethyl acetate was obtained in the form of long needles, M.P. 199–201° C. (dec.) and $[\alpha]_D^{24}$ +67° (c. 1.1, CHCl₃).

*Analysis.*—Calcd. for $C_{22}H_{28}F_6O_3$: C, 58.12; H, 6.22; F, 25.08. Found: C, 57.81; H, 6.22; F, 25.00.

Ultraviolet:

$\lambda_{max.}^{EtOH}$ 239 m$\mu$ ($\epsilon$=16,100), sh. at 290 m$\mu$ ($\epsilon$=135) and sh. at 325 m$\mu$ ($\epsilon$=58)

Infrared:

$\lambda\lambda_{max.}^{KBr}$ 3.20$\mu$ (OH stretch. vib.), 5.98$\mu$ (C=O stretch. vib.) and 6.18$\mu$ (C=C stretch. vib.)

H¹ n.m.r. (CD₃COCD₃ solution): 0.87 (C–18), 1.24 (C–19), triplet at 4.17 (17α-H, J=8 c.p.s.) and 5.63 (C–4).

F¹⁹ n.m.r. (CD₃COCD₃ solution): 2 overlapping quartets appearing as a 5-line pattern centered at 4515 c.p.s.

By reacting testosterone with other perfluoroketones in accordance with the above-described procedure, other testosterone derivatives having a hydroxybis(perfluoroalkyl)methoxy group attached to the 17-carbon atom are similarly obtained. Examples of such hemiketals are: 17β - (tetradecafluoro - 4-hydroxy-4-heptyloxy)androst-4-ene - 3 - one, from perfluoro-4-heptanone; 17β-(docosafluoro - 6 - hydroxy - 6 - undecyloxy)androst-4-ene-3-one, from perfluoro-6-undecanone; 17β-(decafluoro-2-hydroxy-2-pentyloxy)androst-4-ene-3-one, from perfluoro-2-pentanone; and 17β-(tetradecafluoro-2,4-dimethyl-3-hydroxy-3-pentyloxy)androst - 4-ene-3-one, from perfluoro-2,4-dimethyl-3-pentanone. In these compounds, the formulas of the groups attached to the 17-carbon of the testosterone nucleus are, in the order named:

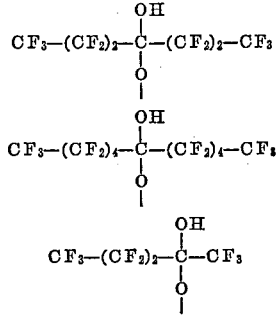

and

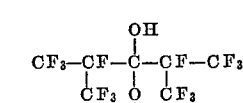

Example 2.—17β-(hexafluoro-2-hydroxyisopropoxy)-4-estrene-3-one

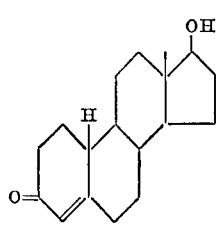 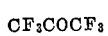 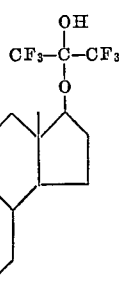

To a cooled (−78° C.) solution of 5 g. (0.018 mole) of 19-nortestosterone in 100 ml. of anhydrous tetrahydrofuran in a flask mounted with a Dry Ice-acetone condenser was added 8 ml. of hexafluoroacetone (measured as the liquid at −78° C.; 0.077 mole). After stirring at −78° C. for 1 hour, the reaction mixture was allowed to warm to ambient temperature over a period of 1 hour and stirred for 21 hours. The reaction mixture was then evaporated to dryness in vacuo and the residue was crystallized from ethyl acetate to give 6.47 g. (81% yield) of 17β-(hexafluoro - 2 - hydroxyisopropoxy)-4-estrene-3-one. An analytical sample prepared by recrystallization from ethyl acetate had M.P. 191.4–193.8° C. and $[\alpha]_D^{24}$ +24° (c, 1.11, CHCl₃).

*Analysis.*—Calcd. for $C_{21}H_{26}F_6O_3$: C, 57.26; H, 5.95; F, 25.89. Found: C, 57.45; H, 6.09; F, 25.55.

Ultraviolet:

$\lambda_{max.}^{EtOH}$ 239 m$\mu$ ($\epsilon$=16,800) and 3.2 m$\mu$ ($\epsilon$=75)

Infrared:

$\lambda\lambda_{max.}^{KBr}$ 3–4$\mu$ (broad, OH stretch. vib.), 6.02$\mu$ (C=O stretch. vib.) and sh. 6.12$\mu$ (C=C stretch. vib.)

H¹ n.m.r. (CD₃COCD₃ solution): 0.89 (C–18), triplet at 4.16 (17α-H, J=8 c.p.s.) and 5.72 (C–4).

F¹⁹ n.m.r. (CO₃COCD₃ solution): 2 overlapping quartets appearing as a 5-line pattern centered at 4513 c.p.s. appearing as a 5-line pattern centered at 4513 c.p.s.

By applying the same procedure with other perfluoroketones, other hemiketals are obtained, examples of which are: 17β-(decafluoro-3-hydroxy-3-pentyloxy)-4-estrene-3-one, from perfluoro-3-pentanone; 17β-hexacosafluoro-7-hydroxy-7-tridecyloxy)-4-estrene-3-one, from perfluoro-7-tridecanone; 17β - (dodecafluoro-2-hydroxy-2-hexyloxy)-4 - estrene-3-one, from perfluoro-2-hexanone; and 17β-(tetradecafluoro - 3-hydroxy - 3-heptyloxy) - 4 - estrene-3-one, from perfluoro-3-heptanone. In these compounds, the formulas of the groups attached to the 17-carbon of the 19-nortestosterone nucleus are, in the order named:

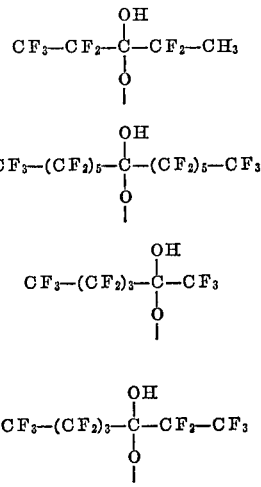

and

Likewise, by reacting 17β - hydroxy-5α-estrane-3-one with the appropriate perfluoroketone under similar conditions, there are obtained hemiketals of the formula

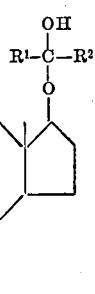

such as, for example, those in which $R^1=R^2=CF_3$ (from hexafluoroacetone); $R^1=CF_3$, $R^2=C_2F_5$ (from perfluoro-2-butanone; or $R^1=R^2=C_3F_7$ (from perfluoro-4-heptanone).

Example 3.—17β-(hexafluoro-2-hydroxyisopropoxy)-5α-androstane-3-one

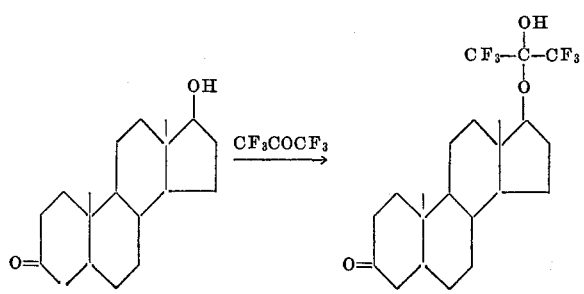

To a cooled (−78° C.) solution of 5 g. (0.0172 mole) of 17β-hydroxy-5α-androstane-3-one in 100 ml. of anhydrous tetrahydrofuran was added 8 ml. (at −78° C.) of hexafluoroacetone. After stirring at −78° C. for 1 hour, the reaction mixture was allowed to warm to ambient temperature and stirred at that temperature for 20 hours (Dry Ice-acetone condenser). The reaction mixture was then taken to dryness and the white solid residue was crystallized from ethyl acetate to give 6.59 g. (84% yield) of 17β-(hexafluoro-2-hydroxyisopropoxy)-5α-androstane-3-one. An analytical sample prepared by recrystallization from ethyl acetate had M.P. 201–203° C. and $[\alpha]_D$ +14° (c. 1.17, $CHCl_3$).

Analysis.—Calcd. for $C_{22}H_{30}F_6O_3$: C, 57.86; H, 6.73; F, 24.98. Found: C, 58.19; H, 6.61; F, 24.48.

Infrared:

$\lambda\lambda_{max.}^{KBr}$ 3.23μ (broad, OH stretch. vib.), 5.88μ

(C=O stretch. vib.)

$H^1$ n.m.r. ($CD_3COCD_3$ solution): 0.82 (C–18), 1.07 (C–19) and triplet at 4.17 (17α–H, J=8 c.p.s.).

$F^{19}$ n.m.r. ($CD_3COCD_3$ solution): 2 overlapping quartets appearing as a 5-line pattern at 4531 c.p.s.

By applying the same procedure to 17β-hydroxy-5α-androstane-3-one and other perfluoroketones, other hemiketals are obtained, examples of which are: 17β-(octadecafluoro-5-hydroxy-5-nonyloxy)-5α-androstane-3-one, from perfluoro-5-nonanone; 17β-(octafluoro-2-hydroxy-2-butoxy)-5α-androstane-3-one, from perfluoro-2-butanone; and 17β-(hexadecafluoro-2-hydroxy-2-octyloxy)-5α-androstane-3-one, from perfluoro-2-octanone. In these hemiketals, the formulas of the groups at the C–17 position are, respectively:

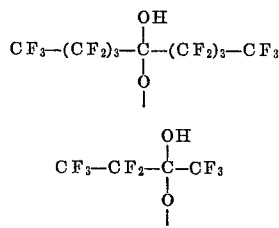

and

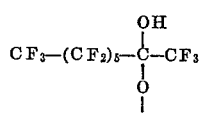

The compounds of this invention are useful in that they all possess androgenic and anabolic activity, as shown by tests on male rats. It has also been found in tests on female rats that these products are all potent anti-implantation and anti-ovulation agents.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A steroid having the structural formula

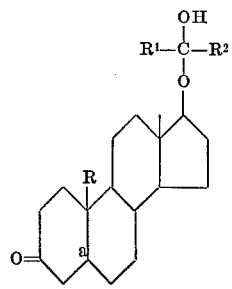

wherein R is selected from hydrogen or methyl; $R^1$ and $R^2$ each are perfluoro lower alkyl groups; and $a$ is selected from a single or a double bond.

2. The steroid of claim 1 wherein R is methyl.
3. The steroid of claim 2 wherein $a$ is a double bond.
4. The steroid of claim 1 wherein R is hydrogen.
5. The steroid of claim 4 wherein $a$ is a double bond.
6. The steroid of claim 1 having the name 17β-(hexafluoro-2-hydroxyisopropoxy)androst-4-ene-3-one.
7. The steroid of claim 1 having the name 17β-(hexafluoro-2-hydroxyisopropoxy)-4-estrene-3-one.
8. The steroid of claim 1 having the name 17β-(hexafluoro-2-hydroxyisopropoxy)5α-androstane-3-one.

References Cited

UNITED STATES PATENTS 2,941,998 6/1960 Fried.
2,933,514 4/1960 Borrevang et al. _____ 260—397.4

OTHER REFERENCES

Simmons et al.: Journ. Amer. Chem. Soc., vol. 82 (1960), pp. 2288–96.

LEWIS GOTTS, *Primary Examiner.*

E. G. LOVE, *Assistant Examiner.*